United States Patent
Chiang et al.

(10) Patent No.: US 9,164,283 B2
(45) Date of Patent: Oct. 20, 2015

(54) MULTI OPTICAL-ROUTE HEAD UP DISPLAY (HUD)

(75) Inventors: Chih-Bin Chiang, Changhua County (TW); Kevin Ho, Changhua County (TW); Jih-Tao Hsu, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 160 days.

(21) Appl. No.: 13/283,875

(22) Filed: Oct. 28, 2011

(65) Prior Publication Data

US 2013/0083039 A1  Apr. 4, 2013

(30) Foreign Application Priority Data

Oct. 4, 2011  (TW) .............................. 100135868 A (51) Int. Cl.
*G02B 27/01* (2006.01)
(52) U.S. Cl.
CPC ............ *G02B 27/0172* (2013.01); *G02B 27/01* (2013.01); *G02B 2027/015* (2013.01); *G02B 2027/0141* (2013.01)
(58) Field of Classification Search
None
See application file for complete search history.

(56) References Cited

U.S. PATENT DOCUMENTS

| | | | | |
|---|---|---|---|---|
| 5,237,455 A * | 8/1993 | Bordo et al. | ................... | 359/632 |
| 2003/0214724 A1 * | 11/2003 | Fujikawa et al. | ............. | 359/630 |
| 2004/0046889 A1 * | 3/2004 | Imoto | ........................... | 348/335 |
| 2005/0154505 A1 * | 7/2005 | Nakamura et al. | ................. | 701/1 |
| 2009/0278765 A1 * | 11/2009 | Stringfellow | ..................... | 345/7 |
| 2010/0157430 A1 * | 6/2010 | Hotta et al. | ................... | 359/630 |
| 2010/0214635 A1 * | 8/2010 | Sasaki et al. | .................... | 359/15 |
| 2011/0267701 A1 * | 11/2011 | Moussa et al. | ................. | 359/630 |

* cited by examiner

*Primary Examiner* — Ulka Chauhan
*Assistant Examiner* — Nurun N Flora
(74) *Attorney, Agent, or Firm* — Rosenberg, Klein & Lee (57) ABSTRACT

A multi optical-route Head Up Display (HUD), comprising: at least an image display unit, to generate at least two input images, and project them respectively to a plurality of relay lenses, which adjusts reflection angle of said input signals and then transmits them to a virtual image generation unit, said virtual image generation unit produces a plurality of virtual images, and transmits them to a plurality of transmission mirrors, which reflects said virtual images to form a large area virtual image. Based on technical contents mentioned above, size of optical elements of lens and mirrors can be reduced drastically, so that said multi optical-route HUD can be miniaturized, to achieve image display range of large area, thus the moving vehicle information frame required completely overlaps outside view, as such effectively solving defects of a conventional single optical-route image display device capable of only providing small area image display.

9 Claims, 12 Drawing Sheets

MULTI OPTICAL-ROUTE HEAD UP DISPLAY (HUD)

BACKGROUND OF THE INVENTION

1. Field of the Invention

The present invention relates to an optical system, and in particular to a multi optical-route Head Up Display (HUD) suitable for use in a moving vehicle.

2. The Prior Arts

Head Up Display (HUD) is an auxiliary aviation instrument that was first utilized in an aircraft, so that a pilot is able to look at the information on the panel without lowering his head, to avoid interruption of attention and lose control of Situation Awareness. The Head Up Display (HUD) can not only provide convenience in usage, but it can also raise the aviation safety. Therefore, it can be used in any of the moving vehicles, such as aircrafts, or even automobiles and ships.

In the past, the Head Up Display of the prior art provided only a small display area of simple instrument information within the eyesight of the driver, such as, vehicle operation temperature, engine rotation speed, vehicle driving speed, or a few guidance reminders having small arrow heads. Nowadays, with the progress of science and technology, the driver may have other multiple choices; wherein, the Head Up Display (HUD) is able to display tire pressure, gear shift reminder, turning-around & back-up reminder, obstacle warning, flying attitude, flying speed, flying direction, vertical speed variations, aircraft inclination angle, wind direction, or other information about the moving-forward or slowdown of the moving vehicle. However, presently on market, any of the Head Up Display belongs to a single optical-route display device, thus it is not easy to integrate the single optical-route display device and an instrument panel into an integral unit, since the volume required by the Head Up Display is overly large for the panel full of wires and various connections. Also, according to the optical and imaging principles, for any lens or mirror, the area required for input image and image formations is positively proportional to the size of optical elements of the lens and mirrors. Furthermore, in order to keep the quality of imaging, the size of optical element used for a Head Up Display can not be reduce further, therefore, it is rather difficult to achieve large display area in a very limited space of the driver cabin. Also, for information displayed in an overly small display area, the driver is not able to obtain critical and important information right away by glancing briefly over instrument control panel; or in case that the driver does raise his head to look at and get the critical information on the display panel in detail, that could disrupt his attention and put him in an immediate danger.

Therefore, presently, the design and performance of the Head Up Display (HUD) is not quite satisfactory, and it has much room for improvements.

SUMMARY OF THE INVENTION

In view of the problems and shortcomings of the prior art, the present invention provides a multi optical-route Head Up Display (HUD), for which size of optical elements of lens or mirrors can be reduced drastically to have a larger display area, hereby realizing a multi-function high caliber multi optical-route Head Up Display (HUD), in achieving safety and efficiency.

A major objective of the present invention is to provide a multi optical-route Head Up Display (HUD), that utilizes the multi optical-route device to partition image into, or uses multiple image display units to produce at least two input images, then coupled with the technical means of re-converging images, to reduce size of optical elements or lenses or mirrors, thus having large area image display capability. The information frame provided by the multi optical-route display device can be overlapped with images of outside view, or the information frame can be matched with images of outside view, to make a display as required, so as to help the driver to pay attention to the critical information of the moving vehicle, in solving shortcomings of the prior art that the single optical-route display device can only achieve small area display.

Another objective of the present invention is to provide a multi optical-route Head Up Display (HUD), that is capable of converging at least two input images produced by a multi optical-route structure into one image to display, and adjusting its image display angle based on the height and seating gesture of the driver by means of the adjustability of a transmission mirror. Compared with the single optical-route display device of the prior art, the present invention enables the driver to have full attention driving and comfort in driving.

In order to achieve the above-mentioned objective, the present invention provides a multi optical-route Head Up Display (HUD), comprising: at least an image display unit, to generate at least two input images; a plurality of relay lenses, to adjust the refraction angles of the input images, and to receive and transmit the input images; a virtual image generation unit, to receive input images and produce a plurality of virtual images; and a plurality of transmission mirrors, to receive the virtual images and reflect them into a large area virtual image.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which:

FIG. 11 A is a schematic diagram of an image of width of 4 m and height of 1 m according to the present invention;

FIG. 11 B is a schematic diagram of an image of width of 2 m and height of 1 m according to the present invention;

FIG. 11 C is a schematic diagram of an image of width of 1 m and height of 1 m according to the present invention;

FIG. 11 D is a schematic diagram of size of a concave lens for an image of width of 4 m and height of 1 m according to the present invention;

FIG. 11 E is a schematic diagram of size of a concave lens for an image of width of 2 m and height of 1 m according to the present invention; and FIG. 11 F is a schematic diagram of size of a concave lens for an image of width of 1 m and height of 1 m according to the present invention.

DETAILED DESCRIPTION OF THE PREFERRED EMBODIMENT

The purpose, construction, features, functions and advantages of the present invention can be appreciated and understood more thoroughly through the following detailed description with reference to the attached drawings.

The present invention provides a multi optical-route Head Up Display (HUD), that utilizes the multi optical-route device to partition image into, or uses multiple image display units to produce, at least two input images, then coupled with the technical means of re-converging images, to display an large area virtual image. Through the application of the present invention, size of optical elements of lenses or mirrors can be reduced directly, to provide large area image display. Moreover, its optimal image display angle can be adjusted based on the height and seating gesture of the driver through using the adjustability of a transmission mirror.

Figure 1:
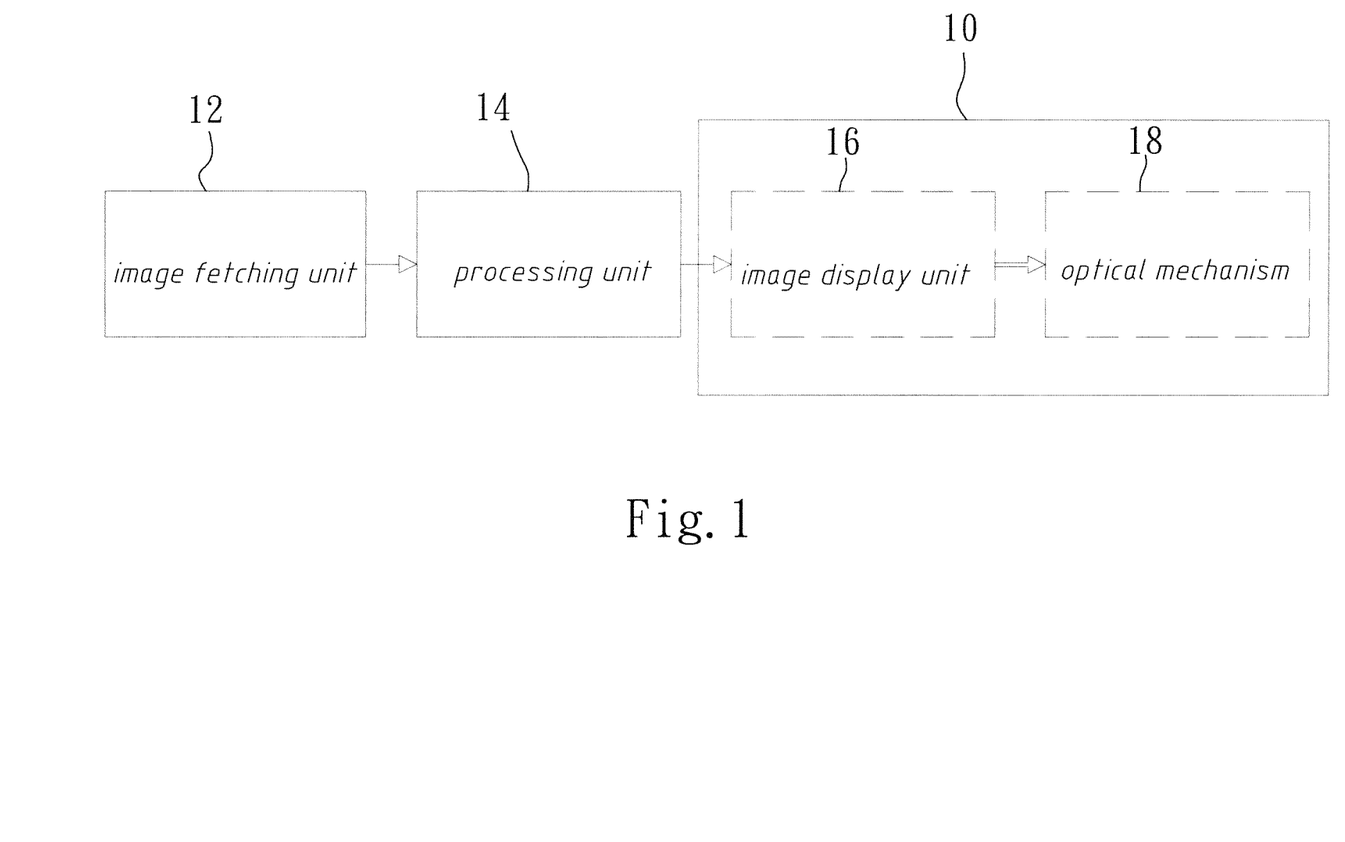
FIG. 1 is a system block diagram of a multi optical-route Head Up Display (HUD) according to the present invention.

Firstly, refer to FIG. 1 for a system block diagram of a multi optical-route Head Up Display (HUD) according to the present invention. As shown in FIG. 1, the multi optical-route Head Up Display (HUD) of the present invention includes: an image fetching unit 12, a processing unit 14, an image display unit 16, and an optical mechanism 18. Wherein, the image fetching unit 12 made of charge-coupled device (CCD) elements or CMOS elements; the processing unit 14 can be a central processor unit (CPU), a microprocessor, or a single chip micro-computer. The processor unit 14 is connected electrically to the image fetching unit 12 and image display unit 16. One or more image fetching units 12 can be used to fetch images of views in front of the moving vehicle, such as lane markings, horizontal line, or obstacle contours; or, additionally, one or more image fetching units 12 are installed around the perimeter of the moving vehicle, to fetch images of blind angle of the moving vehicle, and the image thus taken are used as external signals. At the same time, the processor unit 14 proceeds with receiving and processing the moving vehicle signals relating to vehicle operation temperature, engine rotation speed, vehicle driving speed, guidance information, tire pressure, gear shift reminder, turning-around & back-up reminder, obstacle warning, flying attitude, flying speed, flying direction, vertical speed variations, vehicle inclination angle, wind direction, vehicle moving-forward or slow-down, or obstacle warning obtained through detecting obstacle contour. The processing unit 14 integrates the external signals, vehicle signals, and obstacle warning signal into the critical information required by the moving vehicle, and then processes it into an imaging signal. Finally, the processor unit 14 transmits the image signals to the image display unit 16, for it to generate at least an input image and transmit it to the optical mechanism 18.

Figure 2A:
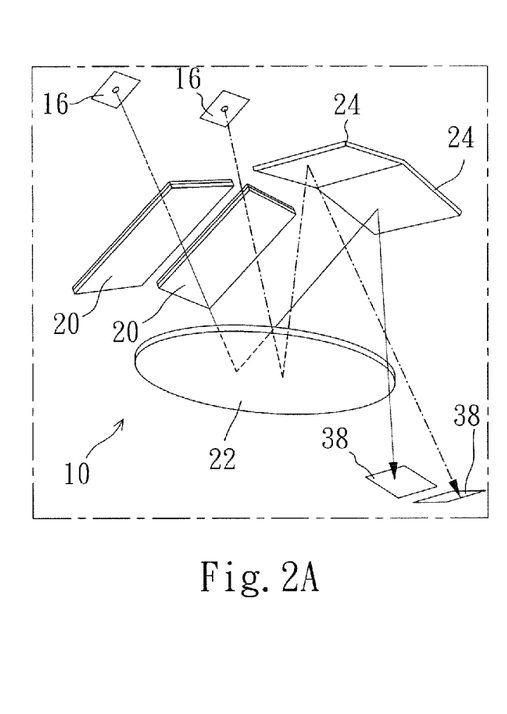
FIG. 2A is a schematic diagram of the structure of a multi optical-route Head Up Display (HUD) according to the first embodiment of the present invention.
Figure 2B:
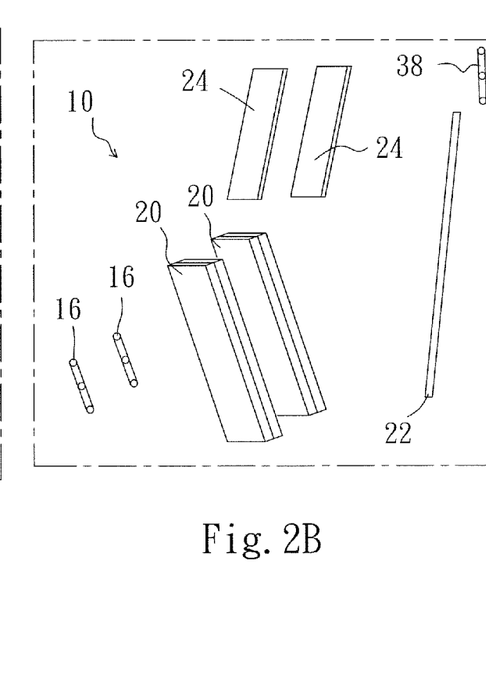
FIG. 2B is a side view of the structure of a multi optical-route Head Up Display (HUD) according to the first embodiment of the present invention.

Then refer to FIGS. 2A and 2B respectively for a schematic diagram of the structure of a multi optical-route Head Up Display (HUD) according to the first embodiment of the present invention, and a side view of the structure of a multi optical-route Head Up Display (HUD) according to the first embodiment of the present invention; meanwhile, also refer to FIG. 1. As shown in FIGS. 1, 2A, and 2B, the multi optical-route HUD includes at least two image display units 16, such as liquid crystal display (LCD) or digital signal processor (DSP) projectors, and at least one optical mechanism 18. The image display unit 16 is able to generate at least two input images and transmit them to the optical mechanism 18. The optical mechanism 18 includes a plurality of relay lenses 20, which receive the input images, then refract to adjust their output angles, and then transmit them to a virtual image generation unit 22 made of convex lens or concave lens. The virtual image generation unit 22 receives at least two input images, and then generates a plurality of virtual images. Finally, a plurality of transmission mirrors 24 receive the plurality of virtual images, and then converge them into a virtual image of large area at an optimal reflection angle. Since in the present invention, an input image is matched with an optical route to serve as a means of implementation, in the first embodiment, at least two input images are taken as an example for explanation, thus two optical routes are required, such that multi optical-route Head Up Display (HUD) includes two relay lenses 20, one virtual image generation unit 22, and two transmission mirrors 24. Therefore, in the technical characteristics disclosed by the present invention, the quantity of input images and optical routes is equivalent to that of the relay lenses 20 and the transmission mirrors 24. Of course, the multi optical-route HUD may utilize more than two input images to match with more than two optical routes 10, such as utilizing three input images, then multi optical-route HUD 10 may include three relay lenses 20, a virtual image generation unit 22, and three transmission mirrors 24. In addition, one or more sets of optical mechanisms 18 may be installed for the moving vehicle, and its way of implementation is to project the input images projected by the image display unit 16 to the corresponding sets of optical mechanisms 18. In the preferred embodiment of the present invention, one set of optical mechanisms are taken as example for explanation, and number of the optical mechanism 18 and the optical routes required can be obtained based on actual requirements, such that its principle of implementation is the same as that of FIGS. 2A and 2B, and it will not be repeated here for brevity.

Figure 3:
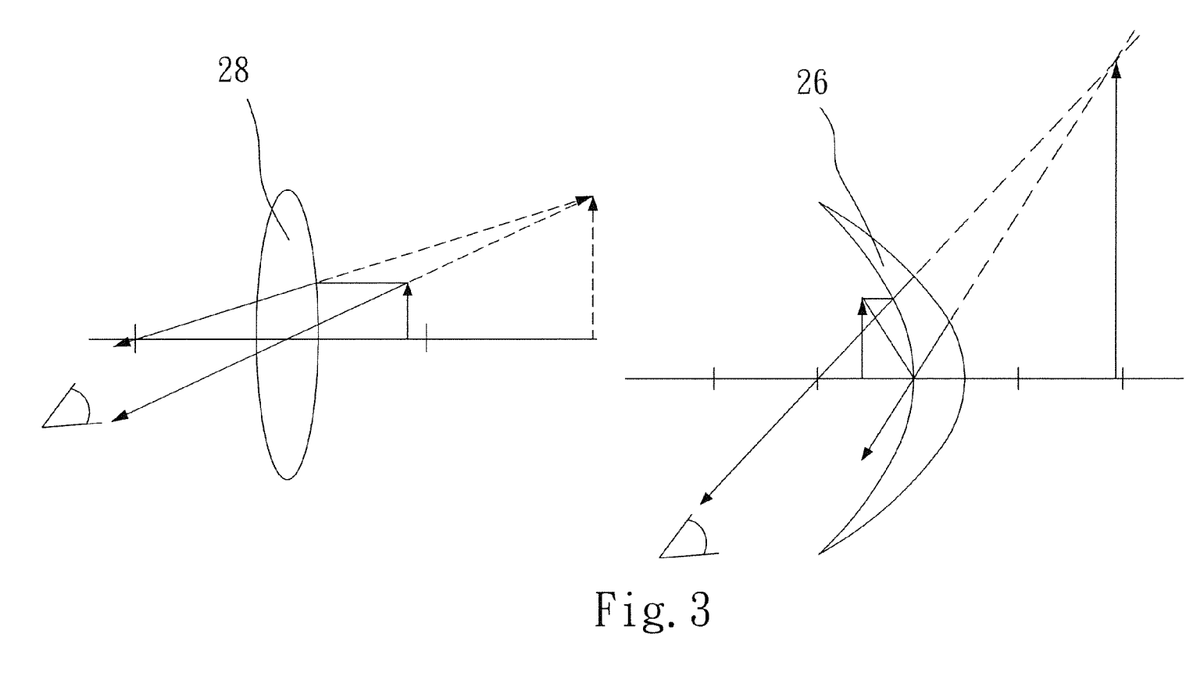
FIG. 3 is a schematic diagram of image formation by a virtual image generation unit according to the present invention.
Figure 4:
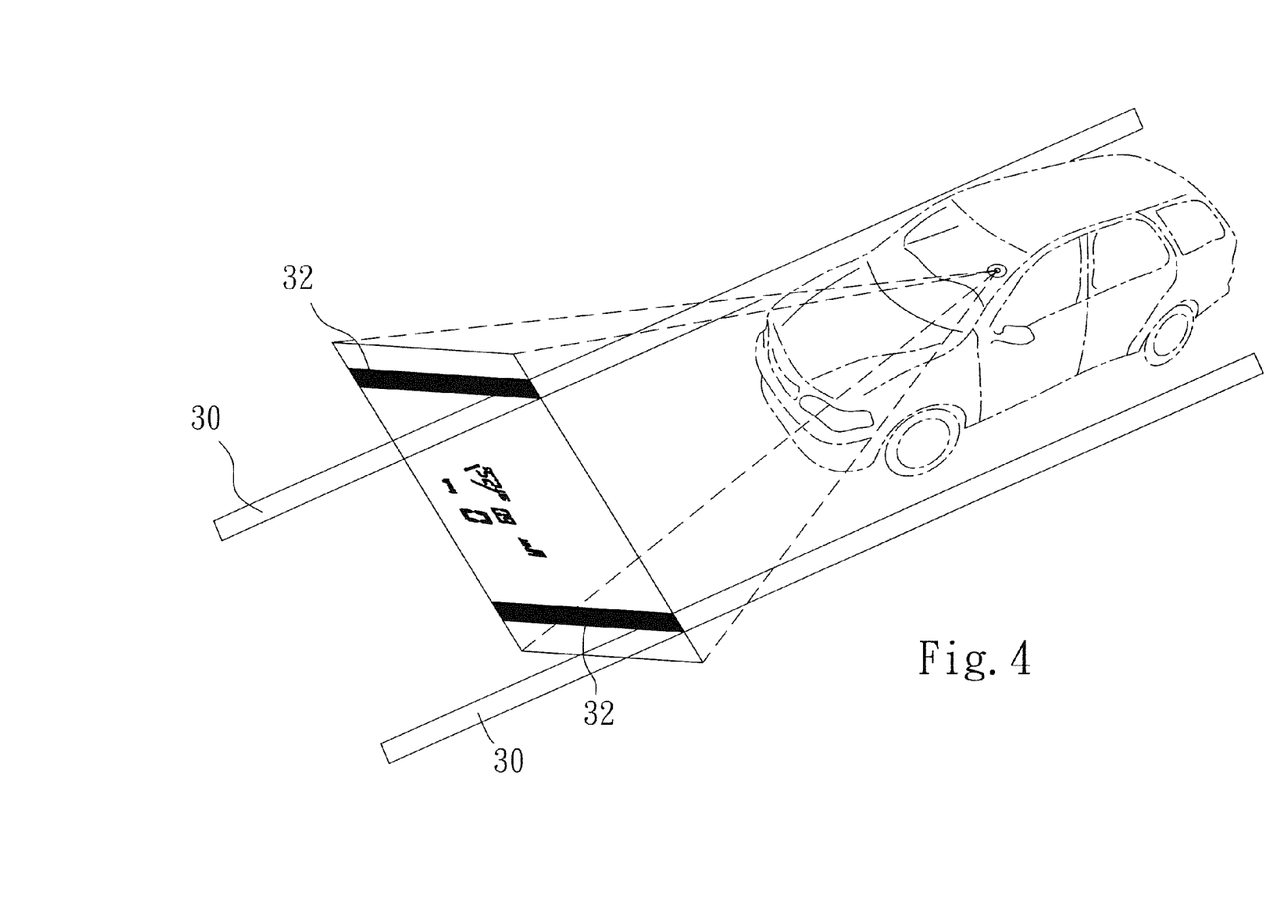
FIG. 4 is a schematic diagram of a large area image formation for a multi optical-route HUD according to the present invention.
Figure 5:
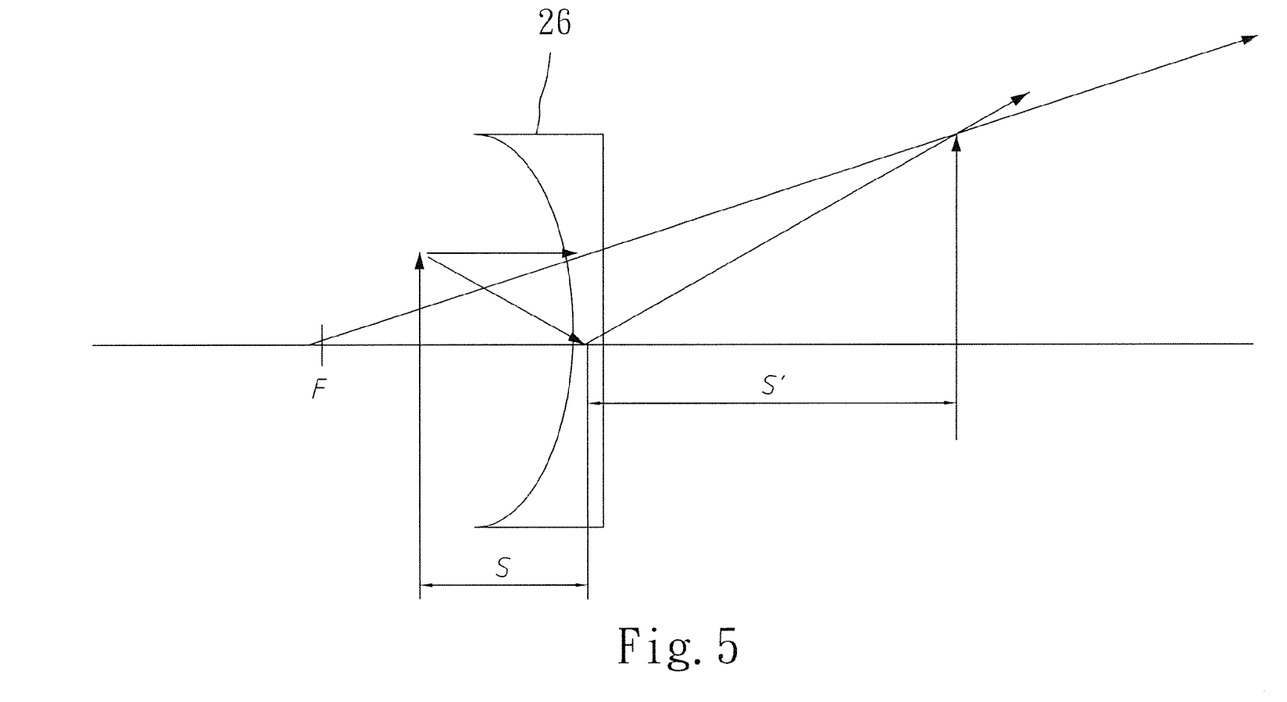
FIG. 5 is a schematic diagram of a concave lens image formation according to the present invention.

Refer to FIGS. 3, 4, 5, 6 respectively for schematic diagrams of image formation by a virtual image generation unit, large area image formation, a concave lens image formation, and curved mirror image formation according to the present invention; also refer to FIG. 2A at the same time. As shown in FIGS. 3 and 4, the virtual image generation unit 22 of the present invention can be a concave lens 26 or a convex lens 28, either of them utilizes optical principle of upright magnified virtual image to generate virtual images, and image is formed outside the window in a large area manner, such that the virtual image generated at least can match the actual lane marking 30, and corresponds to the virtual image lane marking 32. As shown in FIG. 5, the optical characteristics of the concave lens 26 of the present invention are that, when its radius of curvature R is ∞, then it is a concave lens 26, with its focal length ∞; and when its radius of curvature R is 100, then it is curved concave lens 26, with its focal length 50. The concave lens 26 may generate virtual image, and its focal length is as shown in equation (1):

$$f=R/2 \qquad (1)$$

the curved surface of the concave lens 26 can be designed to be an aspheric surface, to avoid generating optical aberrations. When the image display unit 16 is placed within the focal length, the concave lens 26 will present a magnified virtual image, with its magnification ratio as shown in equations (2) and (3):

$$1/S+1/S'=1/f \qquad (2)$$

$$m=S'/S \qquad (3)$$

In equations (1) to (3), R is a radius of curvature, S is an object distance, S' is an image distance, f is a focal length, and m is a magnification ratio.

Figure 6:
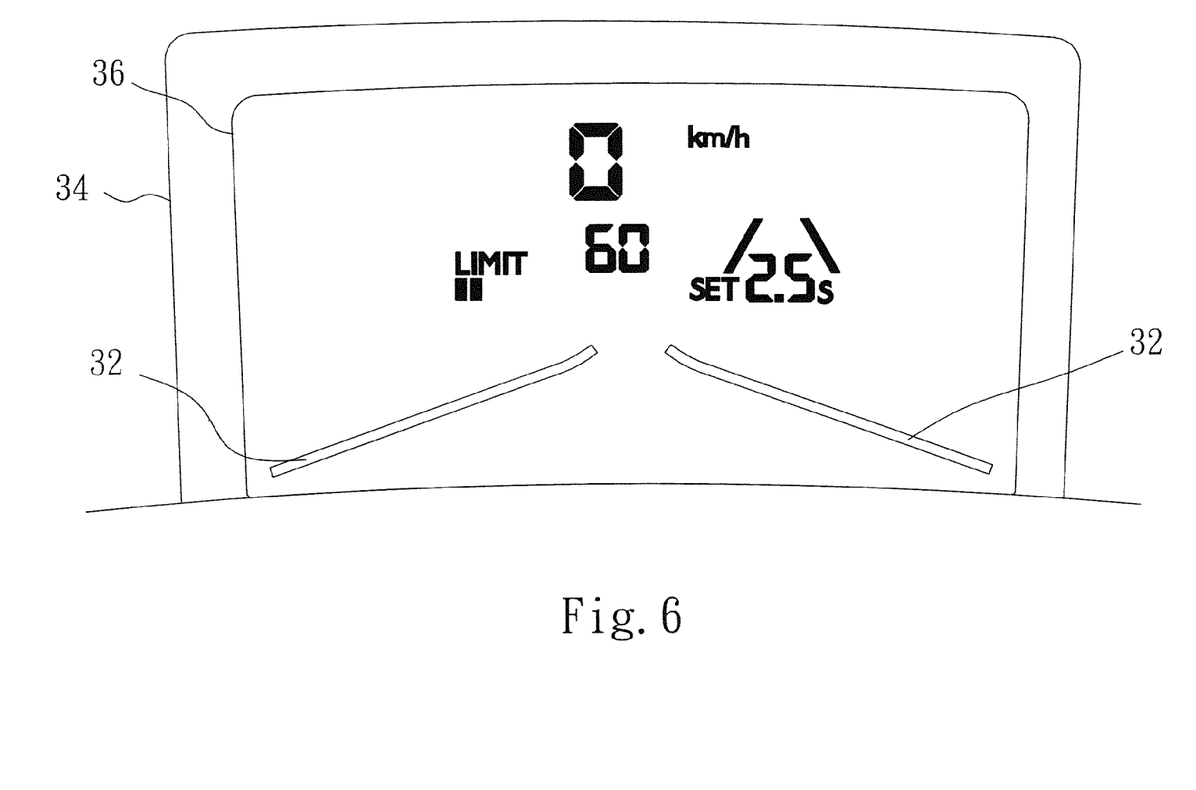
FIG. 6 is a schematic diagram of a curved mirror image formation according to the present invention.

Then, refer to FIG. 6 for schematic diagram of a curved mirror image formation according to the present invention. As shown in FIG. 6, in case that the multi optical-route HUD 10 is used in an automobile, the image display area may correspond to the virtual image lane marking 32, with the image covering an area of 4 meter wide by 1 meter high. Wherein, the transmission mirror 24 is a planar plate of high reflection optical thin film, with its transmission rate between 70% and 75%, and its reflection rate between 25% and 30%, and it is put inside the wind shield 34. As such, the driver may gaze the virtual image in front through the transmission mirror 24 and wind shield 34 in sequence, such that the virtual image overlaps the views in front, or displays the virtual image corresponding to the views in front, and when the number is large for the transmission mirror 24 and the corresponding optical routes, the transmission mirrors 24 appear as a curved mirror 36, so as to display a large image. In FIGS. 4 and 6, the automobile is used as moving vehicle for explanation, so the virtual image lane marking 32 is used as a reference for explanation. Of course, for other moving vehicle such as aircrafts or ships, horizontal lines can be used as a reference, and its principle of operation is the same as above, and it will not be repeated here for brevity.

Figure 7A:
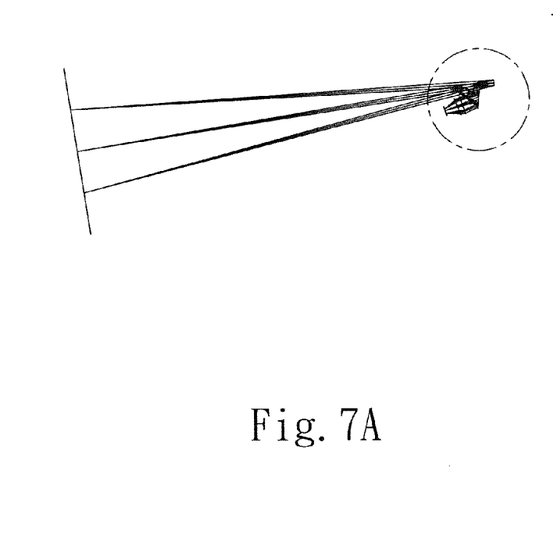
FIG. 7A is a schematic diagram of optical routes for a multi optical-route HUD according to the present invention.
Figure 7B:
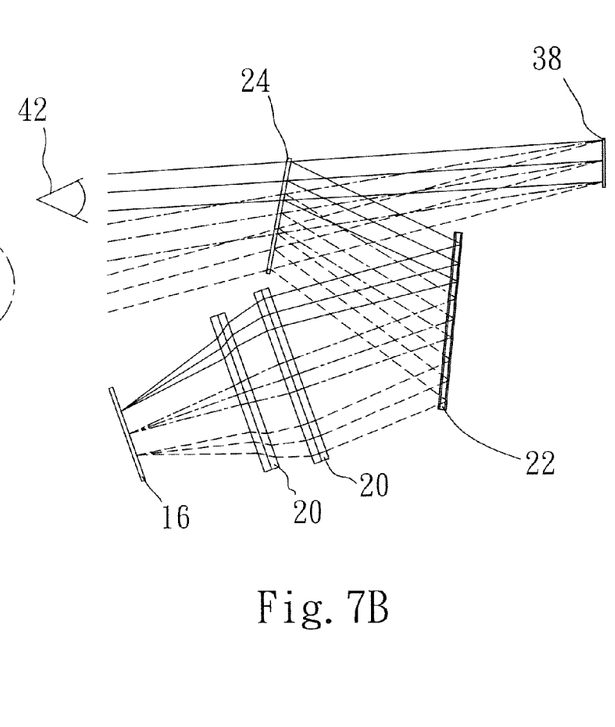
FIG. 7B is a partial enlarged view of FIG. 7A of the encircled area according to the present invention.
Figure 8A:
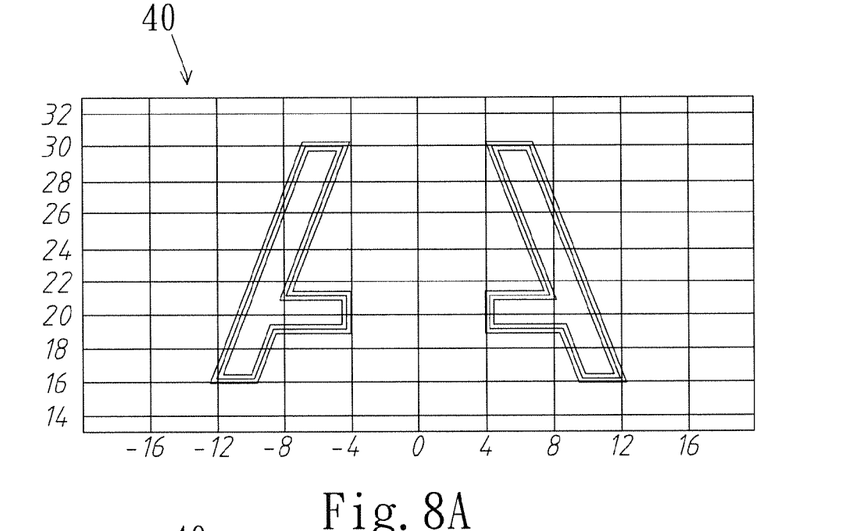
FIG. 8A is a schematic diagram of individual image display according to the present invention.
Figure 8B:
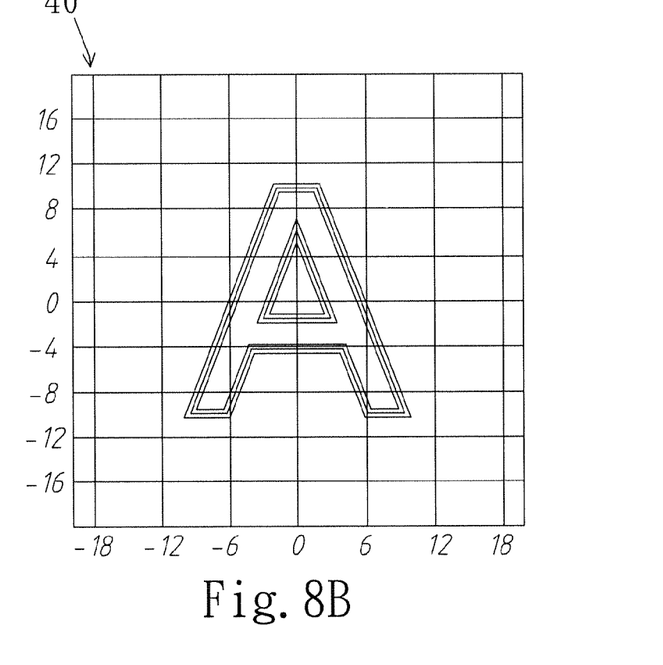
FIG. 8B is a schematic diagram of vision converged range according to the second embodiment of the present invention.

Refer to FIGS. 7A and 7B, FIGS. 8A and 8B respectively for a schematic diagram of optical route, a partial enlarged view of FIG. 7A, individual image display, and vision converged range according to the present invention; also refer to FIG. 2A at the same time. As shown in FIG. 7A, the optical route of the image passes through the image display unit 16, the relay lens 20, the virtual image generation unit 22, and transmission mirror 24, and the placement of above is used to present the optical route trajectory of the present invention. FIG. 7B is a partial enlarged view of FIG. 7A, wherein, the partial enlarged portion is the multi optical-route HUD 10, that further includes a vision converged unit 38 containing a vision converged range 40, such that the transmission mirror 24 may reflect a large area virtual image into the vision converged range 40, for a human eye 42 to observe the large area virtual image in the vision converged range 40. As shown in FIG. 8A, in the present invention, at least two input images are used for explanation, so it utilizes two optical routes to reflect and present left and right halves of virtual image into the vision converged range 40. When various parts of virtual images are combined together, the result is as shown in FIG. 8B, so that a large area virtual image can be observed in the vision converged range 40.

Figure 9A:
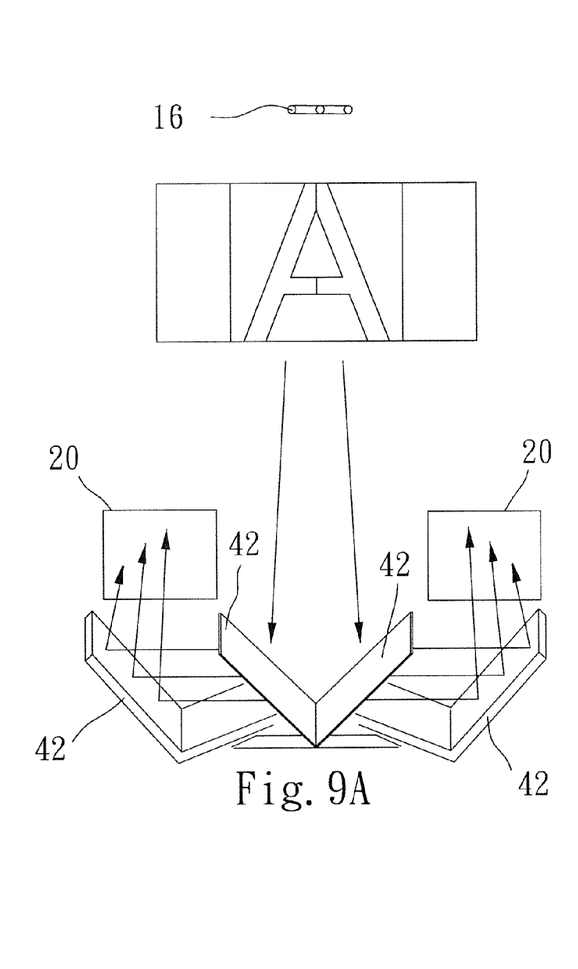
FIG. 9A is a schematic diagram of reflection mirror image partition according to the second embodiment of the present invention.
Figure 9B:
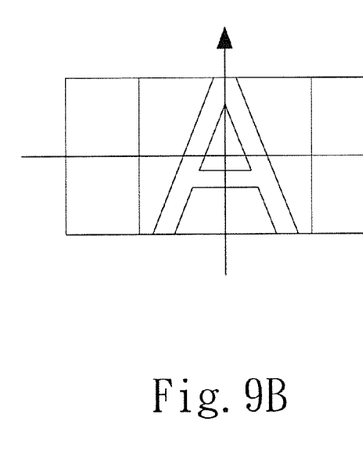
FIG. 9B is a schematic diagram of image partition according to the second embodiment of the present invention.

Subsequently, refer to FIGS. 9A and 9B respectively for a schematic diagram of reflection mirror image partition, and image partition according to the second embodiment of the present invention. As shown in FIGS. 9A and 9B, the second embodiment also utilizes a single image display unit 16 to generate an image, and to partition images based on the same optical principle of the first embodiment through using a plurality of reflection mirrors 42, that are placed between the image display unit 16 and relay lenses 20, so that the reflection mirror 42 may partition image into at least two or more input images, then the reflect the input images to the corresponding relay lenses 20, in a multi section-partition image-transmission way, it can also achieve the purpose and effect of multi optical-route large area virtual image display of the first embodiment. For the second embodiment, the optical-route image transmission after the relay lenses 20 is the same as that of the first embodiment, and it will not be repeated here for brevity. As shown in FIG. 9B, in the second embodiment, an image is partitioned into upper, down, left, and right four sections to proceed with optical-route image transmission in a multi section-partition image-transmission way and reflect them to the relay lens. In the second embodiment mentioned above, more reflection mirrors 42 are used to partition the input image into more sections, and its way of implementation is the same as that of the FIG. 9A, thus it will not be repeated here for brevity. Refer to FIGS. 9A and 2A, as shown in FIGS. 9A and 2A, the second implementation way is the same as the first implementation way in that, the at least two input images must be matched with at least two optical routes, therefore, the number of relay lenses 20, transmission mirrors 24, and reflection mirrors 42 must be the same as that of the input images. Of course, the multi optical-route HUD 10 may utilize more than two optical routes 10 to match with more than two input images, and its principle is the same as that as shown in FIG. 9A, and it will not be repeated here for brevity.

Figure 10A:
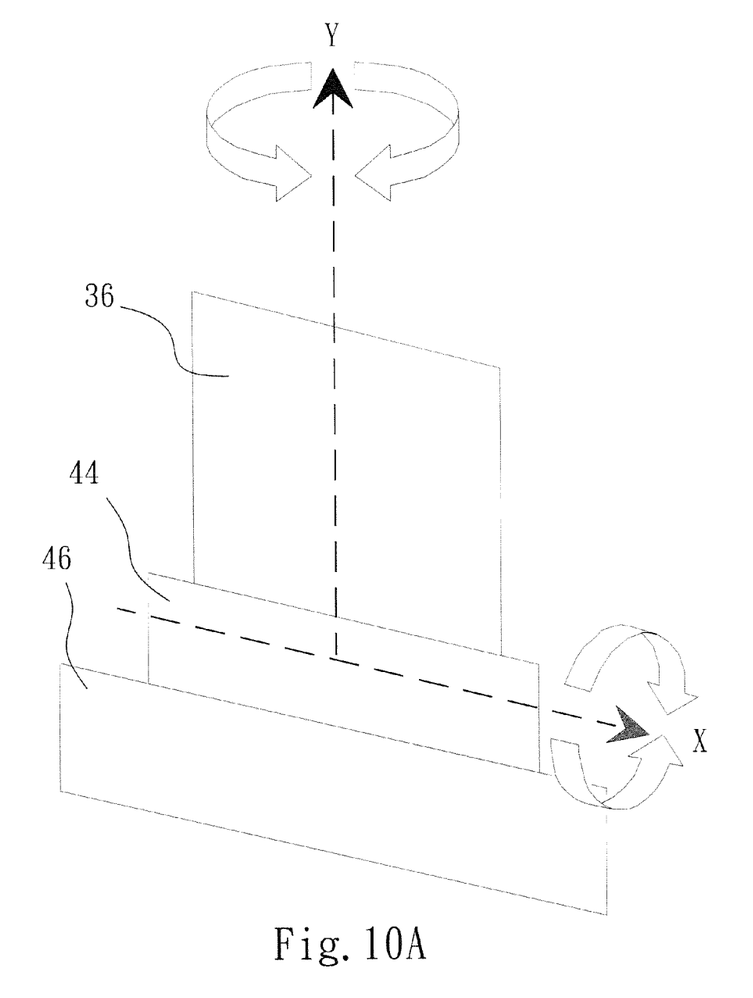
FIG. 10A is a schematic diagram of an adjustable transmission mirror according to the present invention.
Figure 10B:
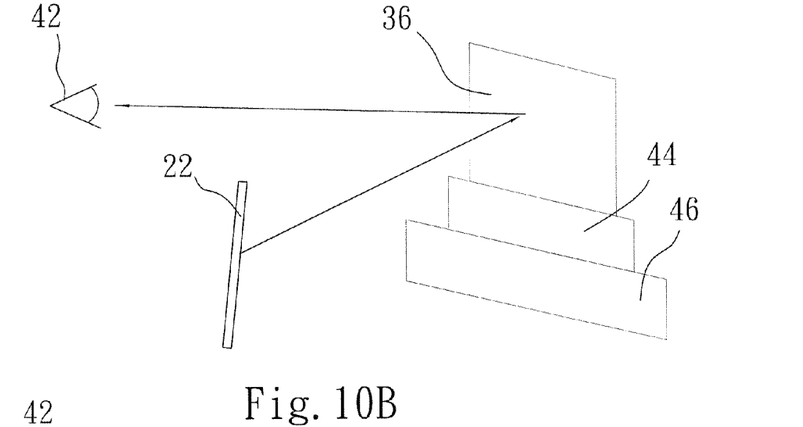
FIG. 10B is a front view of an adjustable transmission mirror according to the present invention.
Figure 10C:
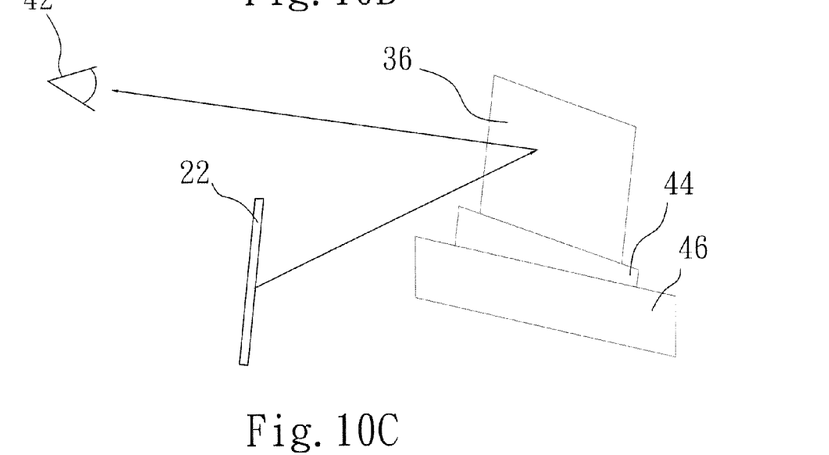
FIG. 10C is a top view of an adjustable transmission mirror according to the present invention.
Figures 11A, 11B:
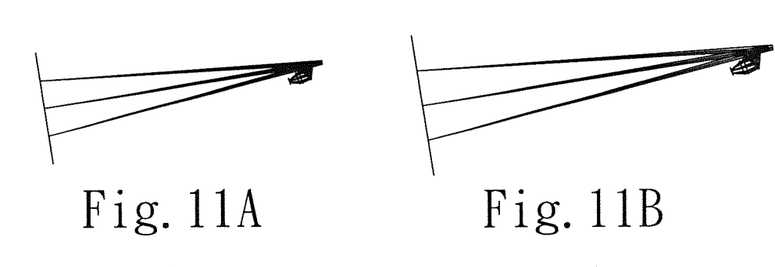
Figure 11C:
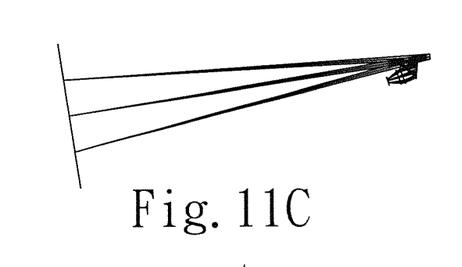
Figure 11D:
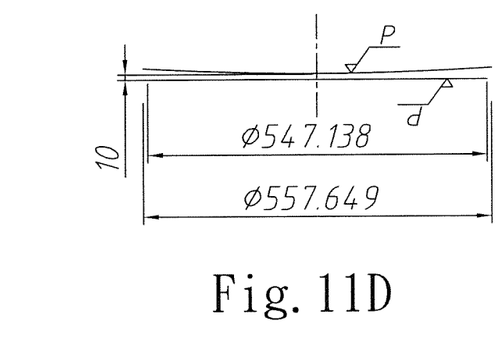
Figure 11E:
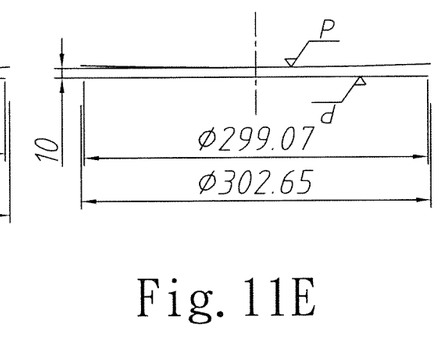
Figure 11F:
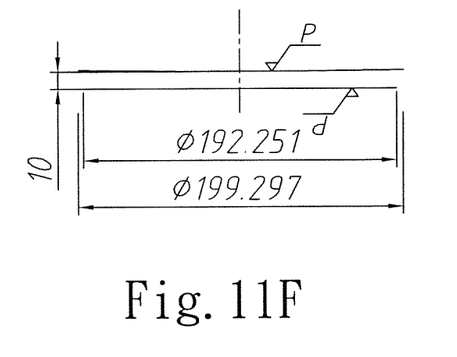

Then, refer to FIGS. 10A, 10B, and 10C respectively for a schematic diagram, a front view, and a top view of an adjustable transmission mirror, according to the present invention. As shown in FIGS. 10A, 10B, and 10C, the transmission mirror 24 of the present invention is adjustable, so that a driver may adjust it to a proper display angle based on his height and seating gesture. As shown in FIG. 10A, the transmission mirror 24 can be fixed on a rotatable mechanism 44, and that is disposed on a rotation actuation mechanism 46, so the rotatable mechanism 44 can be rotated around the horizontal axis X in a clockwise or a counterclockwise direction, and the rotation actuation mechanism 46 can be rotated around vertical axis Y in a clockwise or a counterclockwise direction, such that the transmission mirror 24 is adjustable, and it can be adjusted to a proper display angle based on the height and seating gesture of the driver. As shown in FIGS. 10B and 10C, the rotatable mechanism 44 and the rotation actuation mechanism 46 can be rotated based on the position of human eyes, to adjust the transmission mirror 24 to the optimal display angle.

Finally, refer to FIGS. 11A, 11B, 11C, 11D, 11E, 11F respectively for a schematic diagram of an image of width of 4 m and height of 1 m, of an image of width of 2 m and height of 1 m, an image of width of 1 m and height of 1 m, size of a concave lens for an image of width of 4 m and height of 1 m, size of a concave lens for an image of width of 2 m and height of 1 m, and size of a concave lens for an image of width of 1 m and height of 1 m according to the present invention; meanwhile refer to FIGS. 2A, 3, and 9A. As shown in the drawings mentioned above, regardless of the first implementation way or the second implementation way, when an input image is matched with an optical route, and in case that the virtual image generation unit 22 utilizes the concave lens 26 to present image of 4 m in width and 1 m in height, then the concave lens 26 is required to have inner radius of 547.138 mm, and outer radius of 557.649 mm; when two input images are matched with two optical routes, and in case that the virtual image generation unit 22 utilizes the concave lens 26 to present image of 2 m in width and 1 m in height, then the concave lens 26 is required to have inner radius of 299.07 mm, and outer radius of 302.65 mm; and when four input images are matched with four optical routes, and in case that the virtual image generation unit 22 utilizes the concave lens 26 to present image of 1 m in width and 1 m in height, then the concave lens 26 is required to have inner radius of 192.251 mm, and outer radius of 199.297 mm. Therefore, from the descriptions mentioned above it can be known that, in the present invention, regardless of using the first implementation way or the second implementation way, when the multi optical-route HUD 10 is able to use more input images to match with more optical routes, or more images can be obtained through partitioned by the reflection mirror 42, sizes of optical elements of the virtual image generation unit 22 can be further reduced, while keeping large area image display. As such, the multi optical-route HUD 10 can be miniaturized to be installed easily in an operation cabin, and it can be adjusted to a proper display angle through the adjustability of the transmission mirror 24 as based on the height and seating gesture of the driver.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A multi optical-route Head Up Display (HUD), comprising:
   at least an image display unit, to generate at least two distinct input images;
   a plurality of separately addressable relay lenses, to independently adjust a respective refraction angle of one of said input images, and receive and transmit said input images;
   at least a virtual image generation unit, and said input images outputted from said addressable relay lenses pass along intersecting optical routes to converge toward said virtual image generation unit, so that said virtual image generation unit receives said input images and produces a plurality of virtual images; and
   a plurality of transmission mirrors, to receive said virtual images and reflect them into a converging large area virtual image for concurrent viewing by two eyes of a user, wherein said transmission mirror is a planar plate of high reflection optical thin film, with its transmission rate between 70% and 75%, and its reflection rate between 25% and 30%, and said transmission mirrors are fixed on a rotatable mechanism, and said rotatable mechanism is disposed on a rotation actuation mechanism, and said rotatable mechanism is rotated around a horizontal axis in a clockwise or a counterclockwise direction, and said rotation actuation mechanism is rotated around a vertical axis in a clockwise or a counterclockwise direction, such that a display angle of said transmission mirrors is selectively adjusted based on height and seating gesture of said user.

2. The multi optical-route Head Up Display (HUD) as claimed in claim 1, further comprising: a plurality of reflection mirrors, to reflect and partition an image into said input images, and reflect said input images to said relay lenses; said reflection mirrors are disposed between said image display unit and said relay lenses.

3. The multi optical-route Head Up Display (HUD) as claimed in claim 1, further comprising: a vision converged unit, having a vision converged range, such that the transmission mirror reflects a large area virtual image into said vision converged range.

4. The multi optical-route Head Up Display (HUD) as claimed in claim 1, further comprising: at least an image fetching unit and at least a processing unit, said processing unit is connected electrically to said image fetching unit and said image display unit, said image fetching unit fetches an external signal, and said processing unit receives said external signal from said image fetching unit and processes said external signal and a moving vehicle signal to form an image signal, and then transmits it to said image display unit, so that said image display unit produces said input image.

5. The multi optical-route Head Up Display (HUD) as claimed in claim 4, wherein said external signal is one of following: lane marking, horizontal line, and obstacle contour; and said moving vehicle signal is one of following: vehicle operation temperature, engine rotation speed, vehicle driving speed, guidance information, tire pressure, gear shift reminder, turning-around & back-up reminder, obstacle warning, flying attitude, flying speed, flying direction, vertical speed variations, vehicle inclination angle, wind direction, and vehicle moving-forward or slow-down.

6. The multi optical-route Head Up Display (HUD) as claimed in claim 1, wherein number of said transmission mirrors and said relay lenses is same as that of said input images.

7. The multi optical-route Head Up Display (HUD) as claimed in claim 2, wherein number of said transmission mirrors, said relay lenses, and said reflection mirrors is same as that of said input images.

8. The multi optical-route Head Up Display (HUD) as claimed in claim 1, wherein said image display unit is a liquid crystal display (LCD) or a digital signal processor (DSP) projector.

9. The multi optical-route Head Up Display (HUD) as claimed in claim 1, wherein said virtual image generation unit is a concave lens or a convex lens.

* * * * *